US012606123B2

(12) United States Patent
Maleki et al.

(10) Patent No.: US 12,606,123 B2
(45) Date of Patent: Apr. 21, 2026

(54) SEATBELT RETRACTOR HAVING AN ELECTRICALLY ACTUATABLE BLOCKING DEVICE

(71) Applicant: AUTOLIV DEVELOPMENT AB, Vargarda (SE)

(72) Inventors: Anja Maleki, Glinde (DE); Florian Kuenzler, Wedel (DE); Philip Rings, Norderstedt (DE); Fooke Kutscher, Elmshorn (DE); Christian Kapsalis, Hamburg (DE); Arne Bargmann, Hamburg (DE)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 18/871,030

(22) PCT Filed: May 10, 2023

(86) PCT No.: PCT/EP2023/062368
§ 371 (c)(1),
(2) Date: Dec. 2, 2024

(87) PCT Pub. No.: WO2023/232411
PCT Pub. Date: Dec. 7, 2023

(65) Prior Publication Data
US 2025/0346209 A1 Nov. 13, 2025

(30) Foreign Application Priority Data
Jun. 3, 2022 (DE) ..................... 10 2022 114 164.0

(51) Int. Cl.
B60R 22/343 (2006.01)
(52) U.S. Cl.
CPC .................................. B60R 22/343 (2013.01)

(58) Field of Classification Search
CPC ....... B60R 21/01; B60R 22/34; B60R 22/343; B60R 22/347; B60R 22/35; B60R 22/44;
(Continued)

(56) References Cited

U.S. PATENT DOCUMENTS 3,917,188 A * 11/1975 Nilsson ................. B60R 22/343
242/384.6
4,428,600 A * 1/1984 Doty ....................... B60R 22/44
280/802
(Continued)

FOREIGN PATENT DOCUMENTS

CA 2909549 A1 * 10/2014 ......... B60R 22/1855
CN 101272937 B * 7/2011 ............. B60R 22/34
(Continued)

OTHER PUBLICATIONS

Description Translation for GB 2398824 from Espacenet (Year: 2004).*

*Primary Examiner* — Jason D Shanske
*Assistant Examiner* — Daniel M. Keck
(74) *Attorney, Agent, or Firm* — Dickinson Wright PLLC

(57) ABSTRACT

A seatbelt retractor with a seatbelt shaft and a control cam mounted thereon, and an electrically actuatable blocking device, the electrically actuatable blocking device stopping the control cam with respect to the seatbelt shaft by engagement of the blocking lever into the toothing system of the control cam and, as a result, forcing a locking pawl to perform a movement, in which it passes for engagement into a toothing system, fixed to the vehicle, of the seatbelt retractor and blocks the seatbelt shaft in the pull-out direction, wherein—the blocking lever has a lever arm which projects outwards from the first limb and on which a first spring acts with a first end, which first spring preloads the blocking lever into a position in which it engages into the
(Continued)

Figure 1:
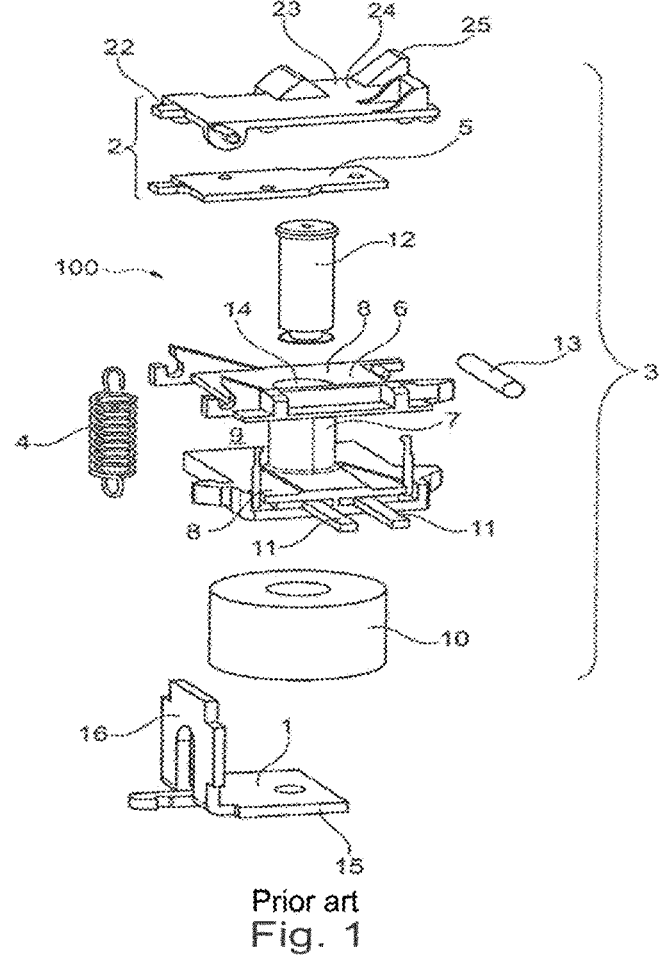

toothing system of the control cam with a blocking tip arranged at the end of a blocking arm.

8 Claims, 4 Drawing Sheets

(58) Field of Classification Search
CPC ........ B60R 2022/442; B60R 2022/444; B60R 2022/4446; B60R 2022/4466; B60R 2022/4473
USPC ...................................................... 280/801.1
See application file for complete search history.

(56) References Cited

U.S. PATENT DOCUMENTS

| | | | | |
|---|---|---|---|---|
| 4,895,317 | A | * | 1/1990 | Rumpf .................. B60R 22/343 |
| | | | | 242/384 |
| 5,201,385 | A | * | 4/1993 | Browne .................... B60T 8/00 |
| | | | | 280/807 |
| 5,443,224 | A | | 8/1995 | Patterson et al. |
| 5,538,098 | A | * | 7/1996 | Sparhawk ............. B60R 22/343 |
| | | | | 280/806 |
| 5,779,178 | A | * | 7/1998 | McCarty ............... B60R 22/343 |
| | | | | 242/384 |
| 6,352,213 | B1 | * | 3/2002 | Sumiyashiki ......... B60R 22/405 |
| | | | | 242/383.2 |
| 2022/0332280 | A1 | | 10/2022 | Glaesser et al. |

FOREIGN PATENT DOCUMENTS

| | | | | |
|---|---|---|---|---|
| DE | 69316678 | T2 | 7/1998 | |
| DE | 102019213915 | A1 * | 3/2021 | ............. H01F 7/081 |
| DE | 102021106683 | A1 * | 9/2022 | ........... B60R 22/343 |
| GB | 2398824 | A | 9/2004 | |
| WO | WO-2007025958 | A1 * | 3/2007 | ............. B60R 22/28 |
| WO | 2021/047982 | A1 | 3/2021 | |

* cited by examiner

Prior art

SEATBELT RETRACTOR HAVING AN ELECTRICALLY ACTUATABLE BLOCKING DEVICE

The present invention relates to a seatbelt having an electrically actuatable blocking device.

An electrically actuatable blocking device of the type in question is known, for example, from GB 2 398 824 A.

Such blocking devices are used to stop an externally toothed control cam, which is rotatably mounted on a seatbelt shaft of the seatbelt retractor, with respect to the seatbelt shaft, by engagement of a blocking lever, and as a result to force a locking pawl to perform a control movement into a toothing system fixed to the vehicle, as a result of which, in turn, the seatbelt shaft is blocked in the pull-out direction.

In conventional mechanical blocking devices, an inert mass is mounted on a contact surface which is deflected when a predetermined vehicle deceleration is exceeded, thereby deflecting the blocking lever and forcing it to engage into the toothing system of the control cam. Such mechanical blocking devices are also referred to as vehicle-sensitive sensor devices. One problem of these mechanical blocking devices is that the inert mass always has to be aligned in a defined orientation on the contact surface with respect to the vehicle longitudinal axis and the vehicle transverse axis, irrespective of the installation geometry of the seatbelt retractor, in order that the seatbelt shaft is not unintentionally blocked. Thus, the seatbelt retractor must be designed to be individual to the vehicle, in that the orientation of the contact surface and the mass applied thereto, relative to the seatbelt retractor, is individually designed such that it corresponds to the predetermined orientation, taking into account the installation geometry of the seatbelt retractor in the vehicle. Furthermore, in the case of seatbelt retractors integrated in the front seats, such as in the case of convertibles, there is the problem that, when the inclination angle of the backrest is adjusted or when the backrests are folded forward for access to the back seats, the inertial mass is unintentionally deflected to the contact surface and as a result the blocking lever is unintentionally forced into the external toothing system of the control cam for a control movement. The seatbelt retractor is thus blocked in the pull-out direction, and the backrest cannot be pivoted further, or the occupant cannot fasten the seatbelt. In order to prevent this, additional disconnection mechanisms or compensation mechanisms must be provided, which, however, may in turn act only in these cases, in order that the restraint of the occupant in the case of an accident is ensured in all cases. As a result of these objects to be achieved, a mechanical blocking device of this kind is mechanically very complex.

In the case of an electrically actuatable blocking device, as is known for example from GB 2 398 824 A, the movement of the blocking lever is, in contrast, electrically controlled, as a result of which the previously required inertial mass is omitted. The seatbelt retractor can thereby be mounted unchanged in different installation positions in the vehicle and also in backrests. Furthermore, the blocking of the seatbelt shaft can be controlled by an electrical signal proceeding from a control device. In this case, the signal can be generated by a control device which can also generate the signal depending on other sensor devices or control systems. For example, it is conceivable to automatically block the seatbelt shaft when a dynamic assistance system is activated, which is controlled for example depending on a signal of an optical sensor device. The electrical blocking device is thus also controlled directly or indirectly, depending on the signal of the optical sensor device. Furthermore, the electrically actuatable blocking device is functional in any orientations and arrangements, since it is not actuated by inertial forces and therefore does not have to be oriented in a specific orientation relative to the vehicle driving direction. Thus, it can preferably also be arranged in seats of at least semi-autonomous vehicles, which the occupant can adjust, for improved communication with the other occupants, for alignment in a rest position, or also generally to make use of the freedom obtained by autonomous driving, in considerably larger adjustment ranges than was possible in the case of seats of conventional nonautonomous vehicles.

Figure 2:
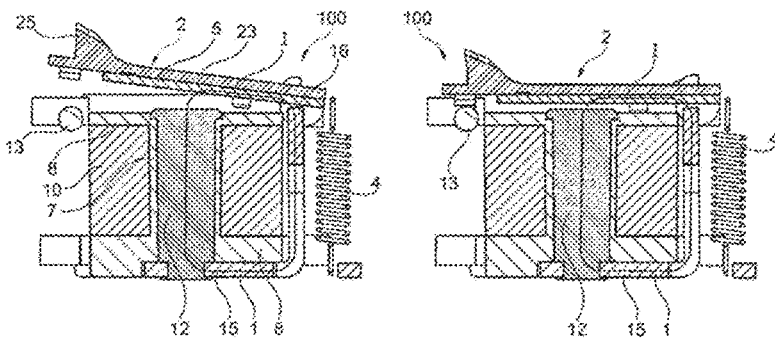
Figure 3:
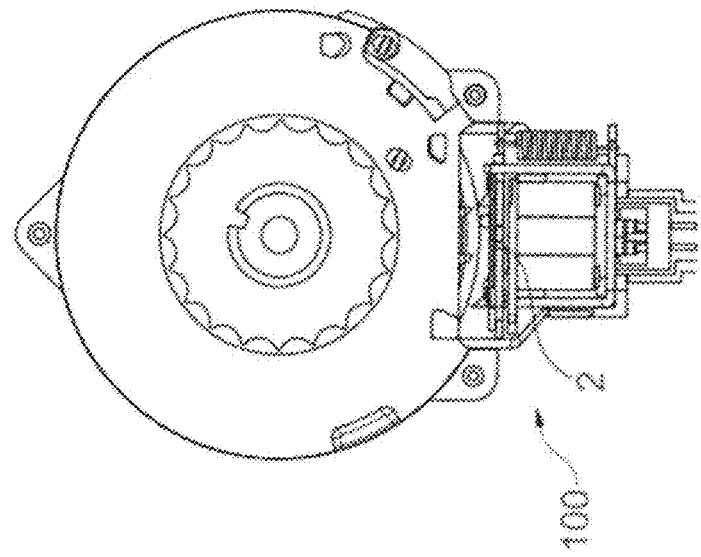
Figure 3:
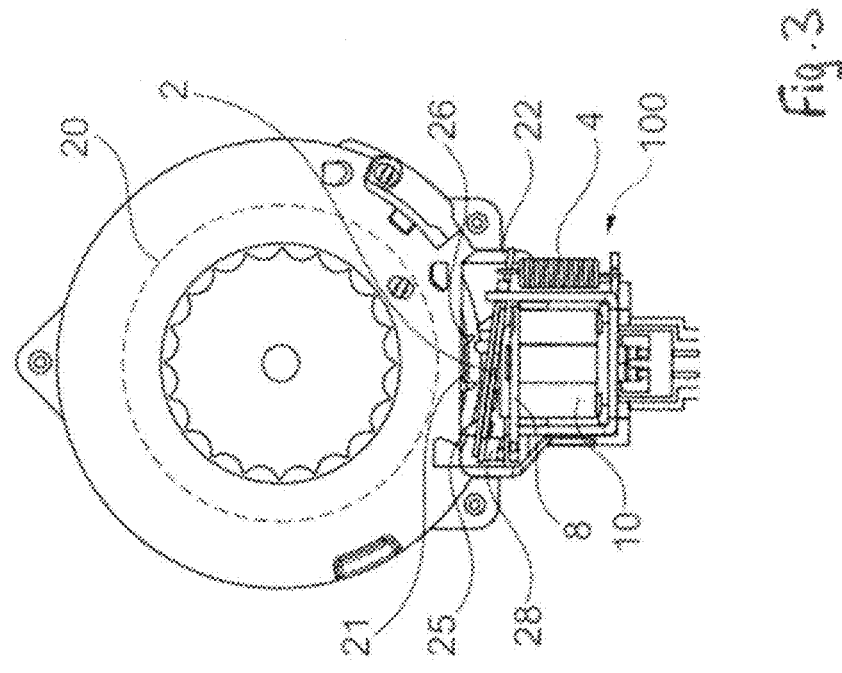

An electrically actuatable blocking device 100 used by the applicant in its products and corresponding to the embodiment of GB 2 398 824 A is shown in FIGS. 1 and 2 as an individual part, and in FIG. 3 on a seatbelt retractor. The electrically actuatable blocking device 100 comprises, as basic elements, a housing 1 having an L-shaped basic structure comprising a base plate 15 and a first upright limb 16, a blocking lever 2 that is pivotably mounted on the first upright limb 16 of the housing 1, an electromagnet 3, and a first spring 4 which is held by one end on the housing 1 and is connected by the other end to a lever arm 22 of the blocking lever 2 projecting outwards from the first upright limb 16. The first spring 4 is designed as a tension spring, such that it preloads the blocking lever 2 into a position in which it engages with a blocking tip 25 into a toothing system 26 of a control cam 21, and thereby holds the control cam 21 back with respect to the seatbelt shaft 20. The control cam 21 comprising the toothing system 26 can only be seen in FIG. 3 in a seatbelt retractor. In this way, when the seatbelt shaft 20 is rotated in the pull-out direction, the locking pawl is automatically forced into a toothing system fixed to the vehicle, and the seatbelt shaft 20 is subsequently blocked against further pulling out of the seatbelt. The blocking lever 2 comprises a contour part 24 and a steel plate 5, the steel plate 5 facing the electromagnet 3 such that the blocking lever 2 is attracted by the electromagnet 3 when this is energized, and is thus pulled out of the toothing system 26 of the control cam 21. As a result, the seatbelt shaft 20 is subsequently freely rotatable in the pull-out and retraction direction. The advantage of this solution is that the seatbelt shaft 20 is blocked in the pull-out direction, even in the event of a power failure or a fault of the electromagnet 3, and the occupant is also reliably restrained in this case.

The electromagnet 3 comprises a base component 6 comprising a column-shaped central portion 7 and two radial flanges 8, one of which in each case projects radially outward at one of the ends of the central portion 7. The electromagnet 3 is held with the base component 6 on the base plate 15 of the housing 1. The base component 6 has a tubular through-portion 14 in the central portion 7 and an annular intermediate space 9 radially on the outside on the central portion 7, the annular intermediate space 9 being limited toward the ends of the central portion 7 by the radial flanges 8. Furthermore, the electromagnet 3 comprises a coil 10 having a plurality of windings, which coil is arranged in the annular intermediate space 9 and is electrically contacted with an external control device via lines 11 provided in the base component 6. In addition, the electromagnet 3 comprises a first iron core 12 which is arranged in the tubular through-portion 14 of the base component 6 and a free end of which faces the steel plate 5 of the blocking lever 2.

When the coil 10 is energized, the blocking lever 2 is attracted in that it closes a first magnetic circuit I, which is defined by the first upright limb 16 of the housing 1, the first iron core 12, and the portions of the blocking lever 2 and the base plate 15 between the first iron core 12 and the first upright limb 16, as can be seen in the right-hand view in FIG. 2. Furthermore, a damping element 13 in the form of an inherently supple tube, for example in the form of a short tube piece, is provided, which element is clamped at its ends between two extensions of the radial flange 8 facing the blocking lever 2. The damping element 13 is positioned in such a way that the free end of the blocking lever 2 does not bear against the damping element 13 in the deflected position (lefthand view in FIG. 2), and comes to rest on the central soft portion of the damping element 13 between the clamping points only in the attracted position (right-hand view in FIG. 2). As a result, the attraction movement of the blocking lever 2 is damped in the final phase of the movement. As a result of this damping, a soft stop is implemented, and disruptive "rattling noises" are avoided during the attraction movement and possible subsequent slight movements of the blocking lever 2.

The object of the invention is to provide a seatbelt retractor in the generic class, having reduced noise generation and a simplified basic structure.

In order to achieve the object, a seatbelt retractor having the above features is proposed. Further preferred embodiments of the invention can be gathered from the claims, the figures and the associated description.

According to the basic idea of the invention, it is proposed that a projection is provided on the housing, shaped in such a way that the first spring bears against it independently of the position of the blocking lever, and is preloaded transversely with respect to the spring force exerted on the lever arm.

The proposed solution additionally preloads the first spring and thus fixes it against uncontrolled movements, thereby reducing the noise generated by preventing physical contact between the first spring and the adjacent parts of the blocking device. The spring is preloaded independently of the position of the blocking lever, so that the first spring is preloaded by the projection both when the blocking lever is in the deflected position (i.e. when the seatbelt shaft is blocked) and when the blocking lever is retracted (i.e. when the seatbelt shaft is released). The first spring bears against the projection in such a way that it is preloaded transversely with respect to the spring force exerted by it on the lever arm, so that the movement of the lever arm has no or only the smallest possible influence on the preload exerted by the projection on the first spring.

The decisive advantage of the proposed solution is that the movement behavior of the first spring, which triggers the movement of the blocking lever, is immediately restricted. This reduces the production of noise as close as possible to its source in the clamping of the first spring on the blocking lever and to the housing. The preload of the first spring not only results in increased clamping of the first spring in the connection with the blocking lever and the housing, but also reduces possible transverse movements of the first spring and thus the probability of the first spring striking the adjacent components of the blocking device and thus the associated potential generation of noise.

In addition, the first spring is held in the region of the base plate by a second end, and the projection is arranged on the first limb of the housing which projects upward from the base plate. The first spring thus extends laterally on the blocking device from the base plate to the lever arm of the blocking lever, such that the first limb provides the first spring laterally with a surface that is structurally easy to use and on which the projection can be arranged. Furthermore, the first spring offers an intermediate portion in the region between the holder on the lever arm and in the region of the base plate that is as long and freely accessible as possible, against which the projection can come into contact and via which the first spring can be loaded.

It is further proposed that the projection is molded onto an attachment part held on the housing. This means that the housing itself does not need to be modified as long as it already has a sufficient attachment surface for fastening the attachment part. Furthermore, the attachment part can be individually shaped to form the projection and can be aligned when fastened, in such a way that the first spring automatically comes into contact with the blocking device due to its fastening, and is preloaded according to the invention.

The attachment part can preferably have a holding attachment arranged in the region of the base plate, and the first spring can be held with its second end on the holding attachment. The attachment part thus also serves to fasten the second end of the spring, which offers the advantage that the projection and the fastening attachment of the first spring for its second end are realized on one and the same part, and are thus arranged in a fixed spatial relationship to one another. Furthermore, the housing does not have to be designed either to form the projection or to attach the second end of the spring, as long as it only has an attachment surface for the attachment part. The attachment part is specially designed so that the holding attachment is arranged in the region of the base plate of the housing. This allows the first spring to be made as long as possible and to be arranged using the entire free space between the blocking lever and the base plate.

The holding attachment can preferably be designed in such a way that it extends the base plate towards the outside. The holding attachment thus forms an extended lug of the base plate, so that the fastening points of the first spring on the lever arm of the blocking lever and on the holding attachment can be formed opposite one another, forming a free space therebetween.

It is further proposed that the first spring is formed by a cylindrical helical spring, and the projection deflects the first spring laterally transverse to its longitudinal extension. The proposed design of the first spring offers the advantage of preloading the first spring by deflecting it laterally without losing its desired properties with regard to preloading the lever arm of the blocking lever. In this case, the first spring is preloaded by the projection transverse to the exertion of its spring force on the lever arm, which has the advantage that the preload of the first spring via the projection is deliberately not, or only partially, directed in the direction of the exertion of the spring force on the lever arm, and thus the spring force exerted by the first spring on the lever arm is in no way reduced—and, if possible, is increased.

It is further proposed that the projection is formed by a cam with a curved contact surface. The first spring is preloaded by the projection and thereby given a curved shape. The projection is adapted to this curved shape of the first spring by its curved contact surface, so that the first spring is pushed into the preloaded shape by the projection as gently as possible, and with forces which are as localized as possible. For this purpose, the contact surface is curved in the same direction as the curvature of the first spring when it contacts the projection.

It is further proposed that the first spring has an elastic plastic sheath at least in the region in contact with the projection. The elastic plastic sheath can further reduce the noise generated when the first spring moves towards the projection by dampening the noise when it comes into contact with the elastic plastic sheath. In addition, the first spring can be protected from external mechanical influences.

Figures 4, 5, 6:
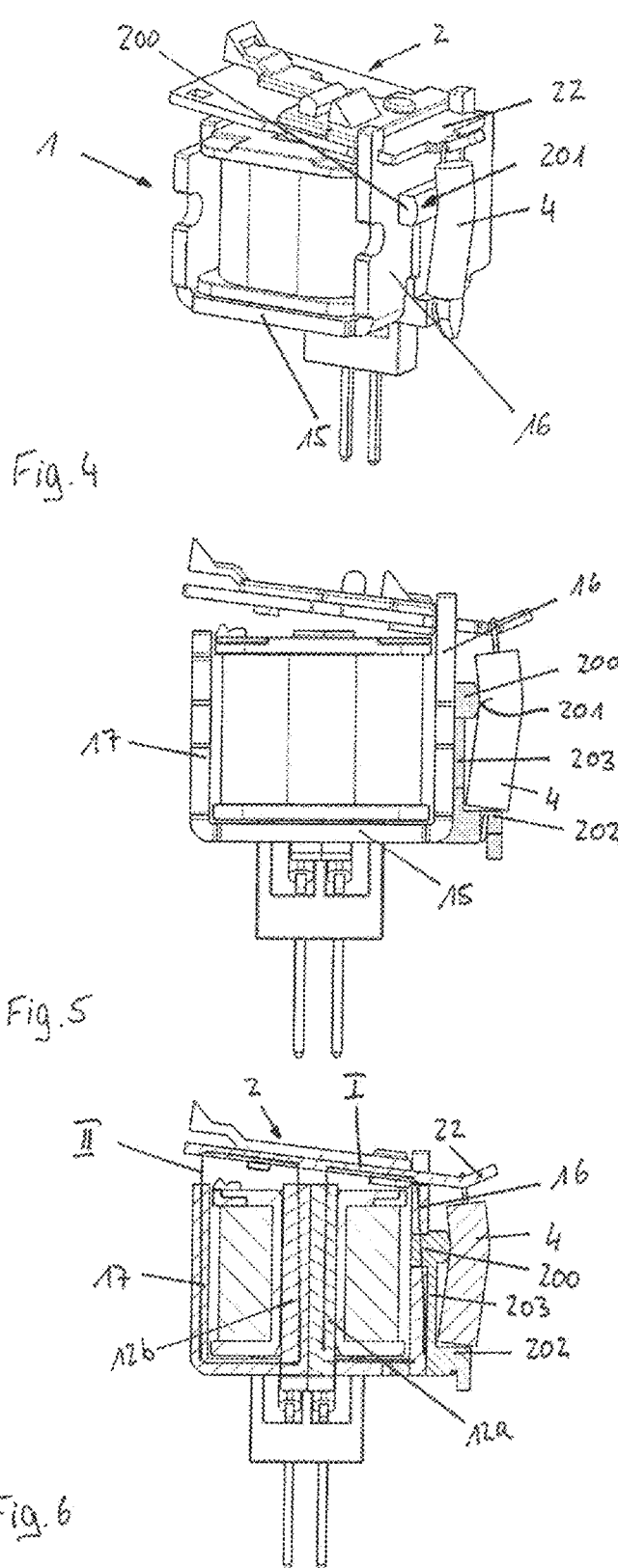
Figure 7:
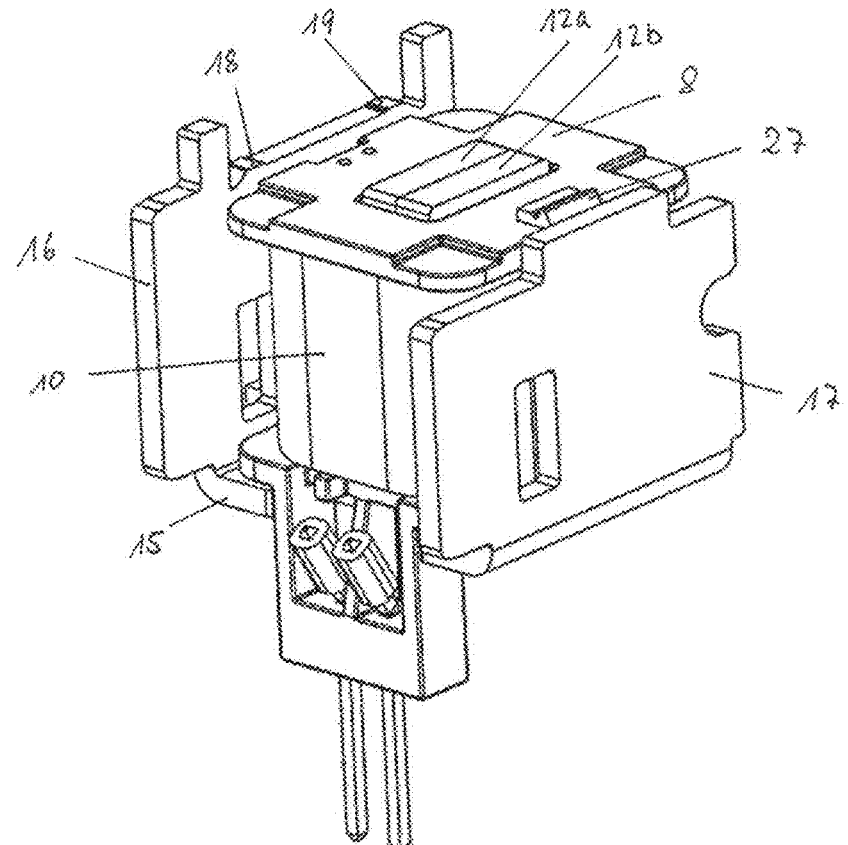

The invention is explained below on the basis of preferred embodiments, with reference to the accompanying figures. In the figures:

FIG. 1 is an exploded view of an electrically actuatable blocking device according to the prior art; and FIG. 2 is a sectional view of an electrically actuatable blocking device according to the prior art, having a blocking lever in two different positions; and FIG. 3 is a seatbelt retractor according to the prior art with a blocking device according to FIGS. 1 and 2, with a blocked and a released seatbelt shaft; and FIG. 4 is a blocking device further developed according to the invention in a perspective view; and FIG. 5 is a blocking device further developed according to the invention in a side view; and FIG. 6 is a blocking device further developed according to the invention in a cutaway view; and FIG. 7 is a blocking device further developed according to the invention, without a blocking lever.

In FIGS. 4 to 6, a further developed electrical blocking device 100 can be seen, which replaces the blocking device 100 in FIGS. 1 to 2 in the seatbelt retractor of FIG. 3 to realize the seatbelt retractor according to the invention. The blocking device 100 of FIGS. 4 to 5 differs from the blocking device 100 of FIGS. 1 and 2 in that a second upright limb 17 is additionally provided on the base plate 15 of the housing 1, which, when the blocking lever 2 is pulled, closes a second magnetic circuit II according to the same principle as the first magnetic circuit I via the first upright limb 16, such that the attraction force of the blocking lever 2 can be increased. For this purpose, instead of the one magnetic iron core 12 in the blocking device 100 of FIGS. 1 and 2, two separate iron cores 12a and 12b are provided. Furthermore, the damping element 13 has been omitted here—but can also be provided additionally if the production of noise and the movement behavior of the blocking lever 2 are to be further dampened. Furthermore, a second spring (not shown) can additionally be provided, which acts directly on the blocking arm 23 and is positioned such that it is preloaded when the blocking lever 2 is pulled towards the housing 1, and supports the pivoting movement of the blocking lever 2 and thereby shortens the locking time of the seatbelt shaft 20. Furthermore, the blocking lever 2 can thereby be further tensioned so that its uncontrolled movements can be further reduced.

The further refined blocking device 100 according to FIGS. 4 to 6 comprises a projection 200 which bears laterally against the first spring 4 and compels it into a curved position. The projection 200 loads the first spring 4 transverse to its longitudinal extension. The projection 200 is formed on an attachment part 203 which is laterally attached to the upright first limb 16 of the housing 1. The attachment part 203 is a plastic part, preferably an elastomer, preferably of the Hytrel type, and is shaped so that it extends to the base plate 15 of the housing 1. The attachment part 203 further comprises a holding attachment 202 which projects outward from the housing 1 of the blocking device 100 in the same direction as the lever arm 22 of the blocking lever 2. The holding attachment 202 is positioned such that it extends the base plate 15 of the housing 1 towards the outside and thus forms an abutment opposite the lever arm 22. The first spring 4 is implemented by a cylindrical helical spring, which is fixed with its first end (upper end in the illustration) to the lever arm 22 of the blocking lever 2 and with its second lower end to the holding attachment 202. The first spring 4 is designed such that, in the fastened position, it exerts a tensile force on the lever arm 22 and thereby preloads the blocking lever 2 into the position shown in FIGS. 4 to 6. At the same time, it rests laterally on a curved contact surface 201 of the projection 200 and is thereby laterally curved and additionally preloaded transversely with respect to the tensile force exerted by it on the lever arm 22. The tensile force exerted by the first spring 4 on the lever arm 22 is exerted in the direction of its longitudinal axis due to the helical shape of the first spring 4. The projection 200 rests laterally on the first spring 4 and deforms the first spring 4 orthogonally to its longitudinal direction. This additionally loads the first spring 4 and further increases the tensile force acting in the first spring 4. This additionally tensions the first spring 4 and increases the tensile force exerted on the lever arm 22. Due to the deformation of the first spring 4 caused by the projection 200, the latter bears against the curved contact surface 201 of the projection 200 regardless of the position of the blocking lever 2, and can therefore carry out no or only very slight noise-causing movements towards the blocking device 100. Furthermore, the attachment part 203 extends up to the base surface 15 of the housing 1 and forms, together with the holding attachment 202, an abutment arranged in the region of the base surface 15 of the housing 1, to which the first spring 4 is fastened with its second end. This allows a first spring 4 with a maximum possible length to be used.

The projection 200 is realized on an attachment part 203 which is fastened to the housing 1, so that the housing 1 does not require any special shaping apart from the fastening of the attachment part 203 to realize the projection 200. Furthermore, the projection 200 is provided with a curved contact surface 201, the curvature of which is aligned with the curvature of the first spring 4 in the region of the contact of the projection 200, so that the projection 200 bears against the curved first spring 4 with an enlarged surface. Furthermore, the projection 200 can be realized on the attachment part 203 by a different material than the housing 1. To realize the magnetic circuits I and II, the housing 1 is preferably made of a magnetic material, preferably of a ferromagnetic metal, while the attachment part 203 is formed here by a plastic, preferably by an elastomer of the Hytrel type, which has the necessary dimensional stability for the deflection of the first spring 4 and at the same time has damping properties with regard to the production of noise due to its elastic properties.

Furthermore, the first spring 4 can additionally be provided with an elastic plastic sheath, wherein the production of noise can be further reduced.

In FIG. 7, the further refined blocking device 100 is shown without the blocking lever 2. The upper radial flange 8 is additionally provided with an upwardly projecting lug 27, which is arranged centrally on a lateral edge of the radial flange 8 facing the second upright limb 17, and has an elongated shape aligned parallel to the lateral edge. Furthermore, the first upright limb 16 is provided with two upright lugs 18 and 19 spaced apart from each other. The lugs 18 and 19 on the first upright limb 16 and the lug 27 on the radial flange 8 together form a three-point support for the blocking lever 2 in the pulled-in position, so that the blocking lever 2 cannot perform any tilting movements in the pulled-in position.

The invention claimed is:

1. A seatbelt retractor for a vehicle, with
   a rotatably mounted seatbelt shaft, and
   a control cam rotatably mounted on the rotatably mounted
      seatbelt shaft and having a toothing system, and an electrically actuatable blocking device comprising a housing having a base plate and an upright first limb, and a blocking lever which is pivotably mounted on the upright first limb and comprises a steel plate, wherein the electrically actuatable blocking device stops the control cam relative to the rotatably mounted seatbelt shaft by an engagement of the blocking lever into the toothing system of the control cam, thereby blocking the rotatably mounted seatbelt shaft in a pull-out direction, and wherein the blocking lever has a lever arm that projects outward from the first limb and on which a first end of a first spring acts, which preloads the blocking lever into a position in which it engages into the toothing system of the control cam with a blocking tip arranged at the end of a blocking arm, and an electromagnet arranged in the housing, which exerts a force on the blocking lever by energization, by means of which force said blocking lever is pulled out of the toothing system of the control cam together with the blocking tip, wherein a projection is provided on the housing, and is shaped in such a way that the first spring bears against it independently of the position of the blocking lever and is preloaded transversely with respect to the spring force exerted on the lever arm.

2. Seatbelt retractor according to claim 1, wherein the first spring is held with a second end in the region of the base plate, and the projection is arranged on the first limb of the housing projecting upward from the base plate.

3. The seatbelt retractor according to claim 1, wherein the projection is molded onto an attachment part held on the housing.

4. The seatbelt retractor according to claim 3, wherein the attachment part has a holding attachment arranged in the region of the base plate, and the first spring is held with its second end on the holding attachment.

5. The seatbelt retractor according to claim 4, wherein the holding attachment extends the base plate towards the outside.

6. The seatbelt retractor according to claim 1, wherein the first spring is formed by a cylindrical helical spring, and the projection laterally deflects the first spring transverse to its longitudinal extension.

7. The seatbelt retractor according to claim 1, wherein the projection is formed by a cam with a curved contact surface.

8. The seatbelt retractor according to claim 1, wherein the first spring has an elastic plastic sheath at least in the region in contact with the projection.

* * * * *